United States Patent
Yu et al.

(10) Patent No.: US 9,959,586 B1
(45) Date of Patent: May 1, 2018

(54) SYSTEM, METHOD, AND COMPUTER PROGRAM FOR ENCODING AND DECODING A UNIQUE SIGNATURE IN A VIDEO FILE AS A SET OF WATERMARKS

(71) Applicant: GoAnimate, Inc., San Mateo, CA (US)

(72) Inventors: Tang Fei Yu, Tsuen Wan (HK); Omar Rabbolini, Ma Wan (HK)

(73) Assignee: GoAnimate, Inc., San Mateo, CA (US)

( * ) Notice: Subject to any disclaimer, the term of this patent is extended or adjusted under 35 U.S.C. 154(b) by 0 days. days.

(21) Appl. No.: 15/377,221

(22) Filed: Dec. 13, 2016

(51) Int. Cl.
 *G06T 1/00* (2006.01)
 *H04N 19/467* (2014.01)

(52) U.S. Cl.
 CPC .......... *G06T 1/0021* (2013.01); *G06T 1/0071* (2013.01); *H04N 19/467* (2014.11); *G06T 2201/0051* (2013.01); *G06T 2201/0064* (2013.01)

(58) Field of Classification Search
 CPC ..... G06T 2201/0052; G06T 2201/0051; G06T 2201/0061; G06T 2201/0065; G06T 2201/0083; G06T 2201/0202; G06T 1/0021; G06T 1/0064; G06T 1/0028; G06T 1/0071; G06T 1/0085; H04L 2209/608; H04N 19/107; H04N 19/13; H04N 19/176; H04N 19/91; H04N 19/119; H04N 19/122; H04N 19/46; H04N 19/467; H04N 1/32144; H04N 1/32229; G06F 21/36; G07D 7/2033
 See application file for complete search history.

(56) References Cited

U.S. PATENT DOCUMENTS

| | | | | |
|---|---|---|---|---|
| 5,905,800 A | * | 5/1999 | Moskowitz | G06T 1/0028 380/28 |
| 6,996,250 B2 | * | 2/2006 | Nakamura | G06T 1/0071 382/100 |
| 7,065,226 B1 | * | 6/2006 | Anzai | G06T 1/0064 382/100 |
| 7,130,443 B1 | * | 10/2006 | Werner | H04N 19/467 382/100 |
| 7,461,256 B2 | * | 12/2008 | Tachibana | G06T 1/0028 380/210 |
| 7,894,628 B2 | * | 2/2011 | Kogure | G06T 1/0064 382/100 |
| 8,903,185 B2 | * | 12/2014 | Wong | G06T 1/0021 382/232 |
| 9,595,125 B2 | * | 3/2017 | Pan | G06T 11/60 |

(Continued)

*Primary Examiner* — Michael Osinski
(74) *Attorney, Agent, or Firm* — Lessani Law Group, PC

(57) ABSTRACT

The present disclosure describes a system, method, and computer program for encoding and decoding a unique signature for a user in a video file, wherein the digital signature is substantially invisible to the viewer of the video, easy to detect during the coding process, does not require specialized equipment for playback of the video, and is resilient to transcoding, video editing, and high compression encoding. A numeric digital signature is converted into a binary number. The binary number is then divided into sequences, where sequence includes a subset of data bits from the binary number. Each sequence is also associated with a sequence ID that enables the data bits in the sequence to be later combined in the correct order to recreate the binary number. A watermark is created for each of the sequences and embedded within suitable areas of a color channel.

30 Claims, 13 Drawing Sheets

(56) References Cited

U.S. PATENT DOCUMENTS

| | | | | |
|---|---|---|---|---|
| 9,813,725 | B1* | 11/2017 | Yu | H04N 19/467 |
| 2003/0028381 | A1* | 2/2003 | Tucker | H04H 20/31 |
| | | | | 704/273 |
| 2003/0108219 | A1* | 6/2003 | Muratani | G06T 1/005 |
| | | | | 382/100 |
| 2003/0128863 | A1* | 7/2003 | Hayashi | G06T 1/0021 |
| | | | | 382/100 |
| 2004/0117629 | A1* | 6/2004 | Koto | G06T 1/0028 |
| | | | | 713/176 |
| 2004/0136531 | A1* | 7/2004 | Asano | G06T 1/0064 |
| | | | | 380/202 |
| 2004/0194126 | A1* | 9/2004 | Kogure | H04N 7/163 |
| | | | | 725/31 |
| 2005/0001033 | A1* | 1/2005 | Cheong | G06T 1/0021 |
| | | | | 235/454 |
| 2005/0094848 | A1* | 5/2005 | Carr | G06T 1/0064 |
| | | | | 382/100 |
| 2006/0062428 | A1* | 3/2006 | Alattar | G06T 1/005 |
| | | | | 382/100 |
| 2010/0067736 | A1* | 3/2010 | Kihara | G06T 1/0028 |
| | | | | 382/100 |
| 2010/0172539 | A1* | 7/2010 | Sugimoto | G06T 1/005 |
| | | | | 382/100 |
| 2011/0228971 | A1* | 9/2011 | Webb | H04N 1/32187 |
| | | | | 382/100 |
| 2012/0230537 | A1* | 9/2012 | Takahashi | G06F 17/30088 |
| | | | | 382/103 |
| 2013/0028326 | A1* | 1/2013 | Moriya | H04N 19/176 |
| | | | | 375/240.16 |
| 2013/0251190 | A1* | 9/2013 | Wong | G06T 1/0021 |
| | | | | 382/100 |
| 2014/0016817 | A1* | 1/2014 | Nakagata | H04N 19/467 |
| | | | | 382/100 |
| 2015/0062166 | A1* | 3/2015 | Pan | G06T 11/60 |
| | | | | 345/633 |
| 2015/0287156 | A1* | 10/2015 | Mai | G06T 1/005 |
| | | | | 382/100 |
| 2016/0012564 | A1* | 1/2016 | Ma | G06T 1/0021 |
| | | | | 382/100 |
| 2017/0116697 | A1* | 4/2017 | Kato | G06T 1/0071 |
| 2017/0171543 | A1* | 6/2017 | Moriya | H04N 19/107 |

* cited by examiner

N=6

| frame | 0 | 1 | 2 | 3 | 4 | 5 | 6 | 7 | 8 | 9 | 10 | 11 | ... |
|---|---|---|---|---|---|---|---|---|---|---|---|---|---|
| watermark | blank | seq A | seq A | seq A | seq A | Blank | blank | seq B | seq B | seq B | seq B | blank | ... |

FIG. 4a

N=4
Video Frame Rate=24fps

| frame | 0 | 1 | 2 | 3 |
|---|---|---|---|---|
| watermark | blank | seq A | seq A | blank |

FIG. 4b

N=2
Video Frame Rate=12fps

| frame | 0 | 1 |
|---|---|---|
| watermark | blank | seq A |

FIG. 4c

$2528012801_{10}$ = 1000 0000 0101 0110 0111 0101 0110 $1001_2$ (LSB first)

| Sequence ID (From left to right) | 0 | 1 | 2 | 3 | 4 | 5 | 6 | 7 |
|---|---|---|---|---|---|---|---|---|
| Data Bits (LSB) | 1000 | 0000 | 0101 | 0110 | 0111 | 0101 | 0110 | 1001 |
| Watermarks | | | | | | | | |

FIGURE 5

Segmented image

Segmented image after filtering noise

Segmented Image with watermark pattern detected

| Sequence ID | Seq Bit 0 | Seq Bit 1 | Seq Bit 2 | Seq Bit 3 | Seq Bit 4 |
|---|---|---|---|---|---|
| 0 | 1 | 1 | 1 | 1 | 1 |
| 1 | 1 | 1 | 1 | 0 | 0 |
| 2 | 1 | 0 | 1 | 1 | 0 |
| 3 | 0 | 1 | 1 | 1 | 0 |
| 4 | 1 | 1 | 1 | 0 | 1 |
| 5 | 1 | 0 | 1 | 1 | 1 |
| 6 | 0 | 1 | 1 | 1 | 1 |
| 7 | 0 | 1 | 0 | 1 | 0 |

Example Sequence ID Mapping

FIG. 7e

SYSTEM, METHOD, AND COMPUTER PROGRAM FOR ENCODING AND DECODING A UNIQUE SIGNATURE IN A VIDEO FILE AS A SET OF WATERMARKS

BACKGROUND OF THE INVENTION

1. Field of the Invention

This invention relates generally to digital rights management, and, more specifically, to encoding and decoding a unique signature in a video file as a set of watermarks.

2. Description of the Background Art

There are companies that provide platforms that enable users to easily make videos, such as animations. For digital rights management, it sometimes desirable for a company to be able to identify the creator of a video, found on the Internet or elsewhere, that was made on the company's platform. Specifically, there is demand for embedding a unique identifier in a video in manner that is:
1. Transparent to the end user (i.e., hidden from the end user);
2. Resilient to transcoding;
3. Resilient to video editing (e.g., clipping/cropping/resizing/change of frame rate);
4. Not requiring specialized equipment for playback of the video (i.e., keeping the video portable and playable across different hardware and software platforms); and
5. Resilient to high-compression encoding (e.g., H. 264).
6. Not requiring the video to be created in a format that supports DRM or encoding a user ID.

Known DRM technology is primarily designed either to prevent a user from copying media or to restrict access to media to certain devices, not to identify a creator of a video. For example, known DRM technology prevents unauthorized copies by ensuring that unauthorized copies are missing data.

Some DRM specifications, such as the Advanced Asset Content System (AACS) specifications and 4C Entity's Content Protection for Recordable Media (CPRM) specifications, support embedding a unique identifier in a video, but such technologies do not satisfy all of the above-listed requirements. They rely on DRM to be handled by the video codec chain and/or by the playback hardware. Therefore, such solutions are not resilient to transcoding and/or require specialized hardware for playback. Also, these solutions required that the video be created in accordance with the AACS or CPRM specifications.

Traditional steganography solutions for embedding data in video are specific to certain video formats and are not resilient to transcoding.

The following research articles set forth new steganography solutions:
(i) A. P. Shirley, P. P. Amritha, "A Compressed Video Steganography using TPVD," International Journal of Database Management Systems (IJDMS), Vol. 2., No. 3, August 2010, pp. 67-80.
(ii) Andreas Neufeld, Andrew D. Ker, "A Study of Embedding Operations and Locations for Steganography in H.264 Video," Proc. SPIE 8665, Media Watermarking, Security, and Forensics 2013, Article ID 86650J (22 Mar. 2013).
(iii) Christian Di Laura, Diego Pajuelo, and Guillermo Kempo, "A Novel Steganography Technique for SDTV-H.264/AVC Encoded Video," International Journal of Digital Multimedia Broadcasting, Volume 2016 (2016), Article ID 6950592, 9 pages.

The techniques set out in the first article ("A Compressed Video Steganography using TPVD) are not transparent to the end user in animated videos (which have more flat color areas than their real-life counterparts) and are not resilient to transcoding. The second and third listed articles are specific to H.264, and, therefore, are also not resilient to transcoding.

SUMMARY OF THE DISCLOSURE

The present disclosure describes a system, method, and computer program for encoding and decoding a unique signature for a user in a video file, wherein the digital signature is substantially invisible to the viewer of the video, easy to detect during the coding process, does not require specialized equipment for playback of the video, and is resilient to transcoding, video editing, and high compression encoding. Furthermore, the method is independent of whether the video file was created using a video format that expressly supports embedding a unique signature in the video file.

The encoding process involves converting a digital signature into a set of watermarks, finding sites in the video where a watermark would be virtually undetectable to the end users, and embedding the watermarks in such sites. During the decoding process, the watermarks are retrieved from video, and the digital signature is recreated from the watermarks.

To convert a numeric digital signature (e.g., a base 10 number) into a set of watermarks, the digital signature is first converted into a binary number. The binary number is then divided into sequences, where sequence includes a subset of data bits from the binary number. Each sequence also is associated with a sequence ID that enables the data bits in the sequences to be later combined in the correct order to recreate the binary number.

A watermark is created for each of the sequences. The watermark is a P×P grid of cells with certain cells corresponding to data bits and certain cells corresponding to the sequence ID. The color of the cell represents the cells value. In one embodiment, a cell can be either black or white, with black corresponding to binary 0 and white corresponding to binary 1.

The watermarks are embedded in a color channel (e.g., the Cb channel) of the video in areas that are substantially the same (based on pixel value) across a set of frames. For either cells representing binary 0 or 1 in the watermark, the pixels in the suitable areas are modified by subtracting a constant value Z to said pixel values. The value of Z is small enough to be invisible to the human eye, but large enough to be preserved during transcoding.

The watermarks are later decoded from the video by extracting the applicable color channel from the video (e.g., the Cb channel). For each pair of consecutive frames in the video, an image is generated that illustrates the areas in the color channel that have a pixel difference across the two frames substantially equally to Z. These areas appear as blobs in the image. The blobs are filtered and analyzed to identify those blobs that match the size and shape of a watermark cell. Watermarks are extracted from the video by identifying groups of blobs that match sequence ID cell patterns and predefined constraints (e.g., spacing and inter-dependency constraints) for a watermark.

Extracted watermarks are mapped to a sequence ID, and the data bits are extracted from each watermark pattern. The digital signature is reconstructed by combing the extracted data bits from each sequence in order of the sequence IDs.

BRIEF DESCRIPTION OF THE DRAWINGS

FIGS. 4a-4c are tables that illustrate examples of the frames in which a watermark is embedded across a set of N frames.

FIG. 5 is a table that illustrates an example set of watermarks for the number

FIG. 7b-7d illustrate example segmented images created when comparing Cb channel of the frames in FIG. 7a.

FIG. 7e is a table that illustrates an example mapping of Sequence ID bits to Sequence IDs.

DETAILED DESCRIPTION OF THE PREFERRED EMBODIMENTS

The present disclosure relates to a system, method, and computer program for embedding a digital signature in a video stream or file in a way which is essentially unnoticeable to an end user, easy to recover programmatically, does not require specialized equipment for playback of the video, and is resilient to transcoding, format conversion, resizing and basic manipulation (e.g., trimming, mirroring). Furthermore, the method does not require that the video format used to create the video specifically support DRM or encoding a user ID.

The encoding process involves converting a digital signature into a set of watermarks, finding sites in the video where a watermark would be virtually undetectable to the end users, and embedding the watermarks in such sites. During the decoding process, the watermarks are retrieved from video, and the digital signature is recreated from the watermarks. Methods for creating, embedding, and decoding the watermarks are set forth below. The methods are performed by a computer system ("the system").

Watermark Generation

Figure 1:
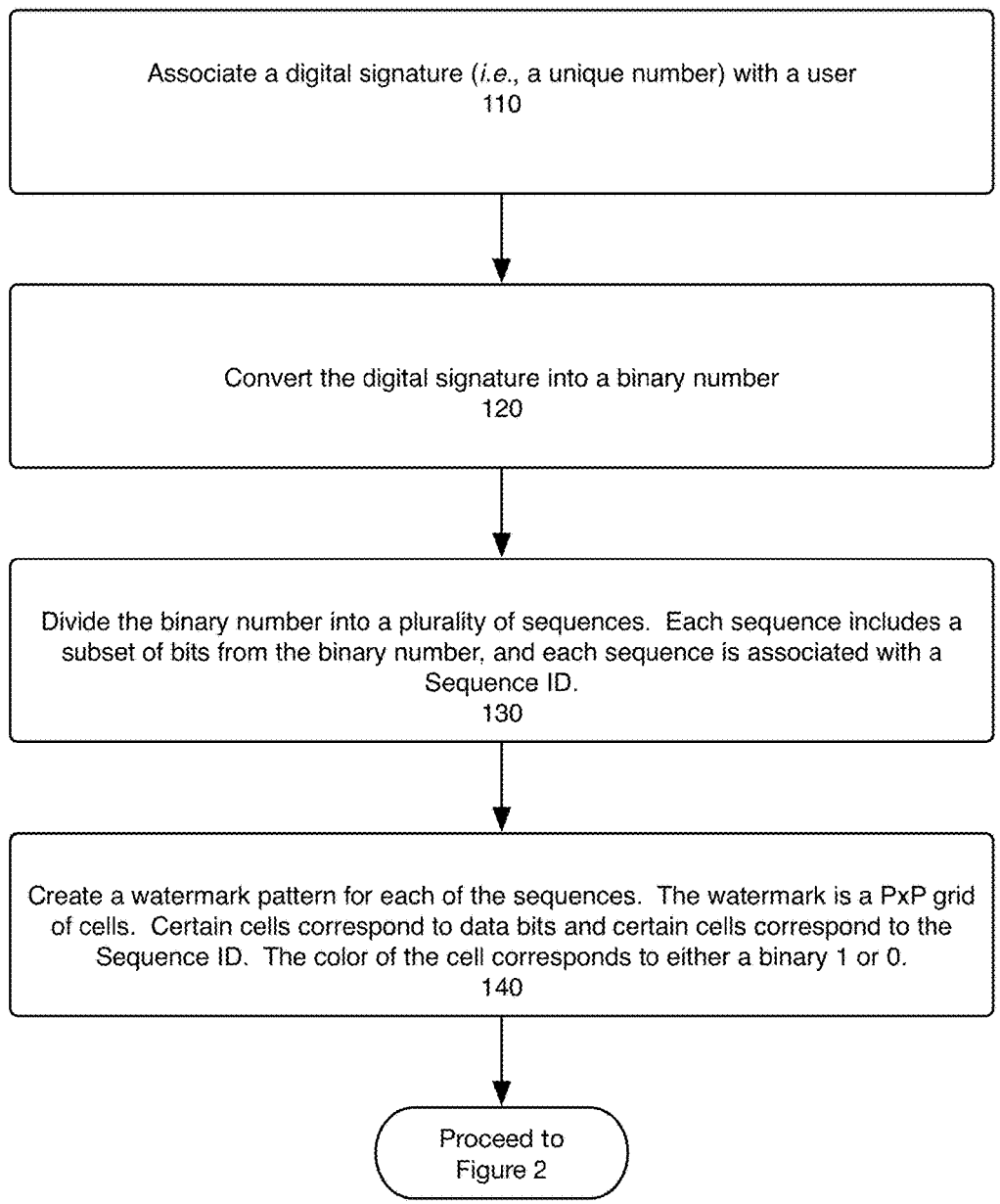
FIG. 1 is a flowchart that illustrate a method, according to one embodiment, for converting a digital signature into a set of watermarks.

FIG. 1 illustrates a method for converting a digital signature into a set of watermarks. The system associates a unique number (e.g., a base 10 number) with a user (step 110). This is the user's digital signature.

The system converts the digital number into a binary number and divides the binary number into a plurality of sequences (steps 120, 130). Each sequence includes a subset of bits from the binary number, and each sequence is associated with a sequence ID to enable the sequences to be later combined in the correct order to recreate the binary number. For example, if there are eight sequences, the sequence IDs could be 0, 1, 2, 3, 4, 5, 6, and 7, with the first sequence (i.e., the sequence having the least significant bits) having sequence ID 0 and the last sequence having sequence ID 7.

The system creates a watermark pattern for each of the sequences. The watermark pattern is a grid of P×P squares (cells), where the color of each cell corresponds to either 1 or 0 in a binary system format. In the preferred embodiment, black cells correspond to 1, and white cells correspond to 0.

Within every watermark, certain cells correspond to data bits and certain cells correspond to the sequence ID. For example, the corner and center cells may correspond to the sequence ID bits, and the remaining cells correspond to data bits as shown in Table 1 below:

TABLE 1

| Sequence ID Bit 0 | Data Bit 0        | Sequence ID Bit 1 |
|-------------------|-------------------|-------------------|
| Data Bit 1        | Sequence ID Bit 4 | Data Bit 2        |
| Sequence ID Bit 2 | Data Bit 3        | Sequence ID Bit 3 |

Each cell is sufficiently spaced from its neighbors to ensure decodability. In the preferred embodiments, the spacing between the cells is the same width as the cells themselves.

The watermarks are created in accordance with a predefined mapping that maps sequence ID cell patterns to sequence IDs. For example, in FIG. 5 (which is discussed in more detail below), sequence ID 0 is mapped to the following pattern:
Upper left corner cell: black
Lower left corner cell: black
Upper right corner cell: white
Lower right corner cell: white
Center cell: white The sequence ID cell patterns are created in accordance with one or more predefined rules that create interdependencies between Sequence ID cells. Specifying that a minimum number of Sequence ID cells are black is an example of a rule that create interdependencies between Sequence ID cells. Such predefined rule(s) increase the decoding success rate, as a group of candidate watermark patterns can be checked against such constraint(s) during the decoding process.

Any sequence ID pattern can be mapped to any sequence ID, provided the interdependency rules are observed. The mapping is used during the decoding process to map a watermark pattern to a sequence ID.

Example Implementation

In an example implementation, a 3×3 grid is used to represent a 32-bit signature. For each sequence, the Sequence ID bits are represented by the four corner cells and the center cell in the grid. The remaining four cells represent the data bits in the sequence, as shown in Table 1 above. The color of each cell corresponds to the value of bit represented by the cell. In this example, a black cell represents the binary value 1, and a white cell represents the binary value 0.

The aforementioned interdependencies between the Sequence ID cells could be a simple rule such as:
Of the four corner cells, only one is allowed to be white (0) per each sequence.

Additionally, to prevent data loss, additional rules can be defined, such as:
A sequence cannot have less than four cells marked as black (1).

This in turn generates eight possible sequence IDs, each with one white corner (4 combinations) and the central site being either black or white (2 combinations, 4×2=8). An additional sequence ID pattern (all four corners and the center marked as black) can be used to cover those cases which do not satisfy the second rule above. For example, one sequence with all data bits set to zero will results in a sequence watermark with only three black cells if the sequence has an ID between 0 and 3 and the sequence ID mapping in FIG. 7e is used (and assuming binary 0 is represented as a white cell). This does not satisfy the second rule above requiring at least four black cells in a watermark. In this special case, the special sequence ID pattern (all four corners and center marked as black), could be used to represent that all data bits are 0, and then each of the data bit cell could correspond to the specific sequence ID (e.g., data bit 0 set to black indicates Sequence ID 0 has all zero data bits; data bit 1 set to black indicated Sequence ID 1 has all zero bits, etc.).

The possible range of digital signature values under this implementation is as follows:

8 sequences
4 binary bits per sequence
8×4=32 binary bits
Range between 0 and $2^{32}-1=4,294,967,295$ As an example, assume the number 2528012801 is a digital signature. A watermark pattern is generated for the digital signature by first converting the number into binary representation as indicated below:

$2528012801_{10}$=1001 0110 1010 1110 0110 1010 0000 $0001_2$

This binary number is reordered with the least significant bit first (i.e., 1000 0000 0101 0110 0111 0101 0110 1001) and then divided into 8 sequences with 4 data bits each. Each of the sequences is represented by a watermark. FIG. 5 illustrates a full set of example watermarks for this number. All the sequence ID cell patterns comply with the rule that only one of the four corner cells can be white per sequence.

Watermark Embedding

After generating watermarks for a digital signature, the system embeds the watermarks into a video. In video formats such as MP4, color information for any given frame is usually encoded using YUV420p, which is a format where the color for each frame is decomposed into a luma channel Y, representing the luminosity of the scene, and two chroma channels Cb and Cr. Among them, the Cb channel, which represents the difference between blue color and luma Y, is less visible since the human visual system is less sensitive to blue color variation. Thus, in video formats such as MP4, watermarks are embedded in the Cb channel to reduce their visibility. However, the methods described below are not restricted to the Cb channel. The same methods could apply to other color channels.

There are two phases for embedding watermarks into a video:

Phase 1: Analyze the frames in the video to identify suitable areas for embedding watermarks.

Phase 2: Sort all the suitable areas in order from 'most suitable' to 'least suitable,' then embed the watermarks one-by-one into the corresponding frames for each of these areas.

Each of these phases is described below.

Identifying Suitable Areas for a Watermark

Figure 2A:
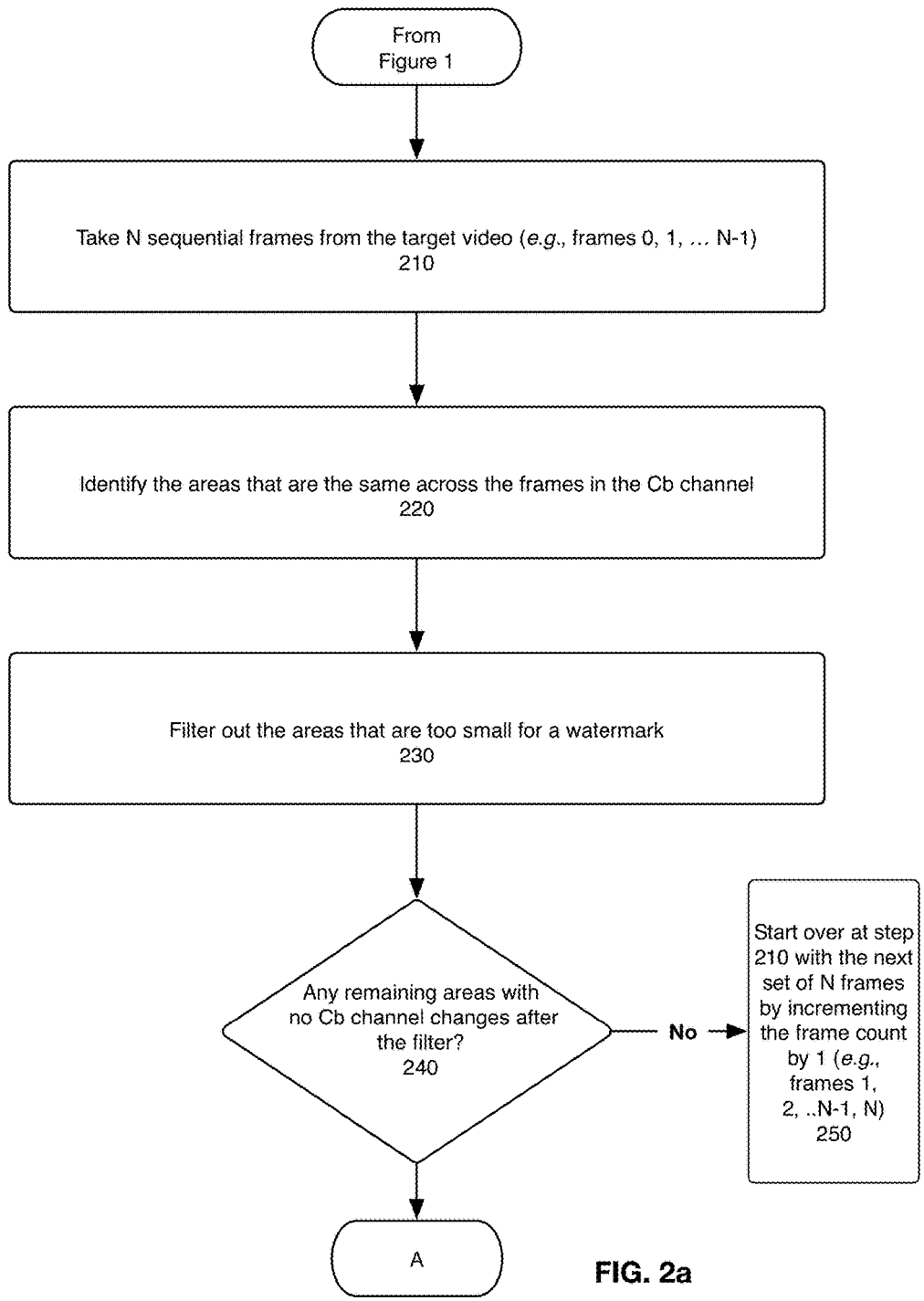
FIGS. 2a-2b are flowcharts that illustrate a method, according to one embodiment, for identifying suitable areas for a watermark.
Figure 2B:
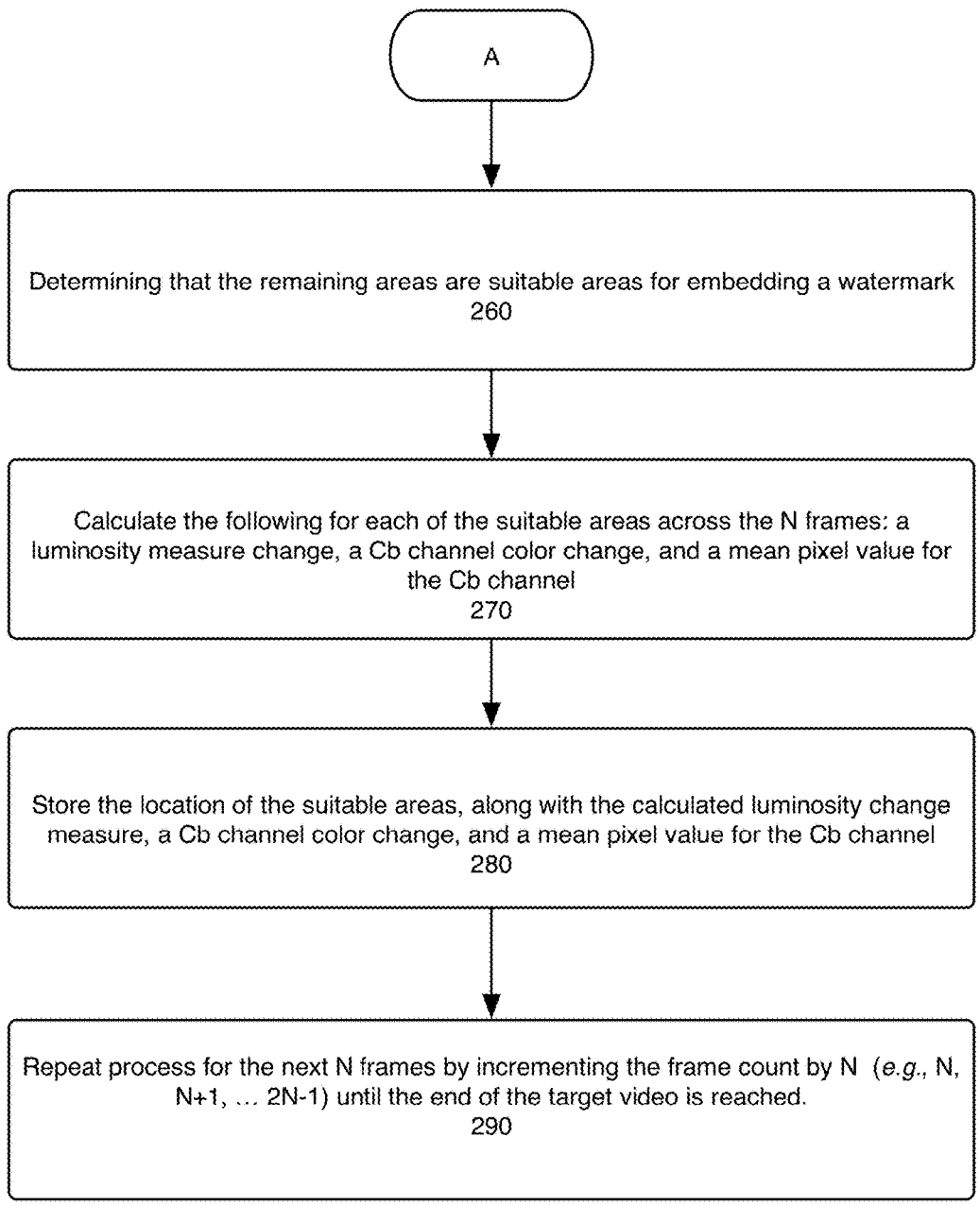

FIG. 2 illustrates a method for identifying suitable areas for a watermark. The system takes N sequential frames from the target video (e.g., frames 0, 1, . . . N−1) (step 210). The system identifies the areas that are the same across the N frames in the Cb channel (step 220). In this case, "same" means no or substantially no change in pixel value.

In one embodiment, the system performs step 220 by using Image Segmentation to generate an image that illustrates the areas that are the same (pixel value wise) and that areas that are different (pixel value wise) across the N frames in the Cb channel. For example, if the change in value in the Cb channel between any two frames is greater than 1, the pixel is marked as 255 (white in a greyscale image) in the generated image. Otherwise, the pixel is marked as 0 (black in greyscale image). This results in black-and-white image in which the black areas represent the areas that are the same across the N frames in the Cb channel. Thus, the black areas are potential suitable areas for a watermark. An "area" is an area of pixels in the set of N consecutive frames.

The system filters out the areas that are too small for a watermark (step 230). In one embodiment, the system performs step 230 by using well-known Morphological Operations to enlarge the radius of each white pixel so that they cover an area equal to or greater than the candidate watermark. When the "erode" morphological operator is used, areas that are too small automatically disappear. The following reference describes how to use the erode operator in mathematical morphology to filter noise:

Gonzalez, Rafael, "Digital Image Processing (Third Edition)," ISBN-13: 978-0131687288, chapter 9.2, 2007. The contents of this reference are incorporated by reference herein.

Any remaining areas after the filter step, are deemed suitable areas (steps 240 to 260). In other words, "suitable areas" are areas that (1) have substantially no changes in the Cb channel across the N frames and (2) are large enough for a watermark. If there no suitable areas in the current N frames, the system starts the process over with the next set of N frames by incrementing the frame count by one (e.g., frames 1, 2, . . . N−1, N) (steps 240 to 250).

If there are suitable areas in the current N frames, the system calculates the following for each of the suitable areas (steps 270):

Luminosity measure change: In one embodiment, this is the standard deviation for the Y channel.
Cb channel color change measure: In one embodiment, this is the standard deviation for the Cb channel.
Mean pixel value for Cb Channel
A sample calculation for the above is as follows:
Given a random distribution X, the mean and standard deviations could be calculated from:
Mean=E(X)
Standard Deviation=square root of $E(X^2)-E(X)^2$
The Operation E( . . . ) is the same as the Blur operator with mean kernel size K×K (where K is the width of the watermark divided by 2).
Therefore, blurring the image is sufficient to retrieve the mean and standard deviation measures for any given $(2×K)^2$ area within the image itself.

The system stores the locations of the suitable areas in the current N frames, along with the luminosity change measure, Cb channel color change measure, and mean for the Cb channel for each suitable area (step 280). The process is repeated for the next N frames by incrementing the frame count by N (e.g., N, N+1, . . . 2N−1) until the end of the target video is reached (step 290).

Embedding Watermarks

Figure 3:
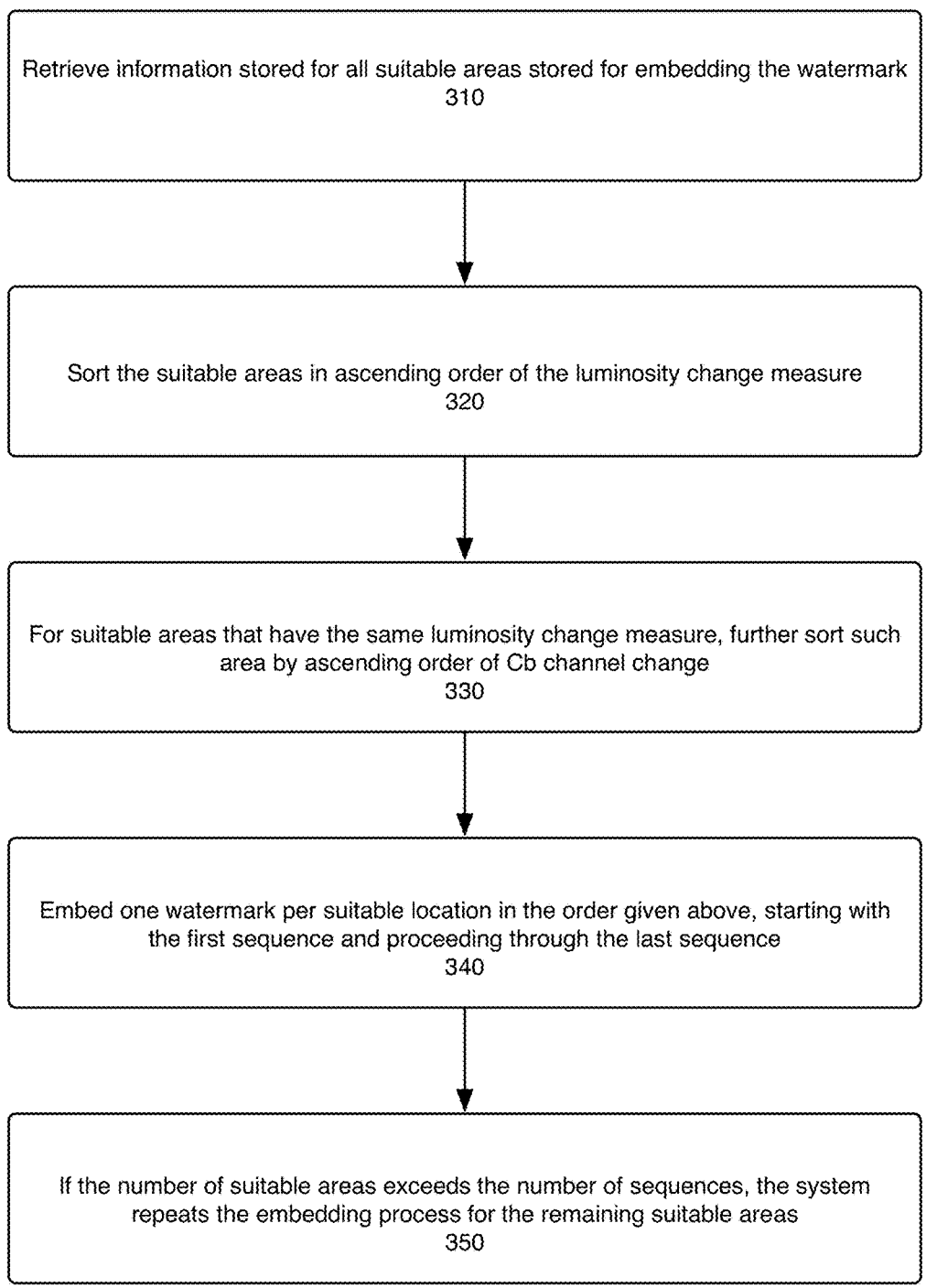
FIG. 3 is a flowchart that illustrate a method, according to one embodiment, for embedding a set of watermarks in a video.

FIG. 3 illustrates a method for embedding a set of watermarks in a video. The system retrieves all suitable areas stored in phase 1 above (step 310). The system sorts the suitable areas in ascending order of visibility. In one embodiment, this means that the suitable areas are first sorted in ascending order of the luminosity change measure (e.g., standard deviation of the Y channel) (step 320). For suitable areas that have the same luminosity change measure, the areas are further sorted by ascending order of Cb channel color change measure (e.g., standard deviation of the Cb channel) (330).

The system then embeds one watermark per suitable location in the order given above, starting with the first sequence (i.e., sequence ID 0) and proceeding through the last sequence (step 340). If the number of suitable areas exceeds the number of sequences, the system repeats the embedding process for the remaining suitable areas (step 350). For example, if there are five sequences (with sequence IDs 0, 1, 2, 3, and 4) and seven suitable areas, the sequences would be embedded as follows: 0, 1, 2, 3, 4, 0, 1.

Embedding the watermark is achieved through modification of the candidate frame. Specifically, pixels in the suitable area corresponding to either (not both) the white cells or black cells of the watermark are modified. In one embodiment, for each black cell (1) in the watermark, the corresponding pixels in the suitable area are modified slightly by adding or subtracting a constant value Z their pixel value. Alternately, the pixels corresponding to only white cells (0) in the watermark are modified by adding or subtracting a constant value Z to their pixel value.

It is worth noting that, with respect to the rule, "of the four corner cells, only one is allowed to be white (0) per each sequence," in the above-described example implementation, this rule is based on the following assumptions: (1) in performing the watermark embedding, the black cells will be modified by a constant value Z, and (2) cells modified by a constant value Z will appear as black blobs in the segmented image during the decoding process (see discussion of step 630 below).

The value of Z is small enough to be invisible to the human eye, but big enough to be preserved in transcoding. For example, an implementation using H.264 would work best with a Z value between 1 and 3, the exact value being determined by the standard deviation of the Cb channel in the suitable location. The higher the standard deviation, the higher the value of Z. Otherwise, the watermark might be lost or made visible during transcoding.

Each watermark is embedded in a subset of the N frames constituting the suitable location. FIG. 4*a* illustrates an example of this. In this example, N=6 (i.e., the suitable location is across 6 frames). The watermark is embedded in the middle four frames, where the first and last frame in the suitable location are blank. In the illustrated example, sequence A is embedded in frames 1-4, with frames 0 and 6 blank. Likewise, sequence B is embedded in frames 7-10, with frames 6 and 11 blank.

The value of N depends on the resilience to frame rate changes desired for the watermarks. The higher N, the higher the resilience to transcoding. In a typical implementation with a target video frame rates of 24 fps, with an expected resilience to transcoding to 12 fps, the minimum value of N is four, with watermarks embedded as illustrated in FIG. 4*b*. Once transcoded to 12 fps, the frames in FIG. 4*b* would be reduced to the frames in FIG. 4*c*, which is sufficient for decoding, as one frame with the sequence is preserved.

The minimum video length required for successful decoding is dependent on the following:
1. The value of N. The greater N, the longer video required.
2. The size of the watermark grid (e.g., 3×3 vs. 5×5). The larger the watermark, the longer the video required.
3. The grain of the video, wherein less grainy video (e.g., animation, computer generated graphics, etc.) requires shorter clips to represent the whole digital signature.

In one embodiment, for a value of N=4, a 32-bit signature (which equates to a 3×3 watermark grid), and an HD (720p) or above video, the minimum video length for the methods described herein to be implemented successfully is 2 seconds at 24 frames per second.

Decoding

Figure 6A:
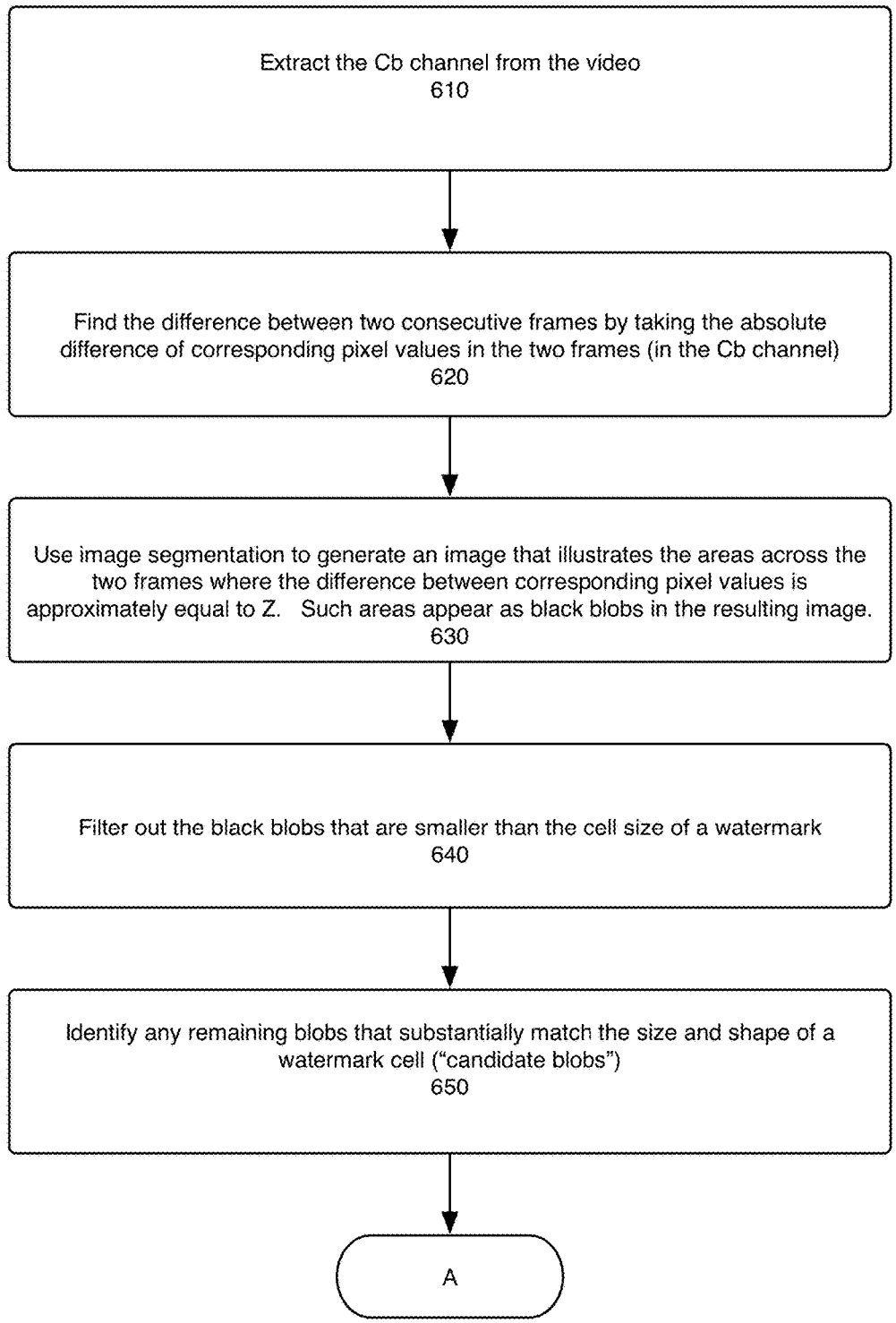
FIGS. 6a-6b are flowcharts that illustrate a method, according to one embodiment, for decoding a digital signature from a video in which watermarks are embedded.
Figure 6B:
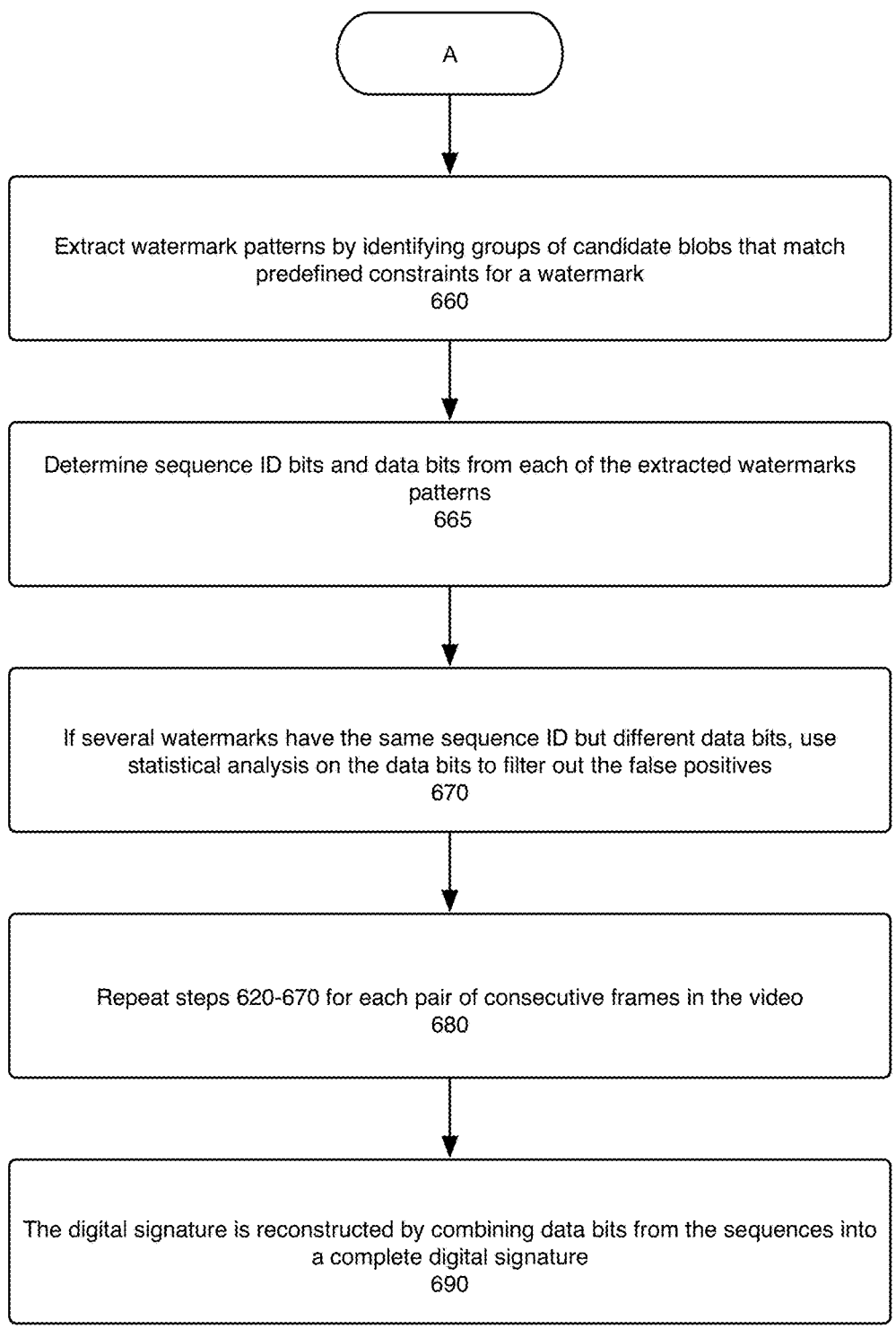

FIG. 6 illustrates a method for decoding a digital signature from a video in which watermarks are embedded in accordance with the above methods.

The system extracts the Cb channel from the video (step 610). The remaining steps in FIG. 6 are performed with respect to the Cb channel. These steps are performed for each pair of consecutive frames in the video.

The system finds the difference in the Cb channel between two consecutive frames by taking the absolute difference of corresponding pixel values (in the Cb channel) in the two frames (step 620). The system then uses image segmentation to generate an image that illustrates the areas where the difference between corresponding pixel values is approximately equal to Z (i.e., Z plus or minus a tolerance) (step 630). For example, in an embodiment using H.264, Z is a value between 1 and 3, and the tolerance is 1 or 2, meaning segmented image displays areas where the corresponding pixel value difference between frames is between 0-5.

In one embodiment, step 630 is performed as follows:
1. If the absolute pixel value between corresponding pixels in two consecutive frames is substantially equally to Z, the corresponding pixel in the new image is marked as black.
2. Otherwise, the pixel is marked as white.

Figure 7A:
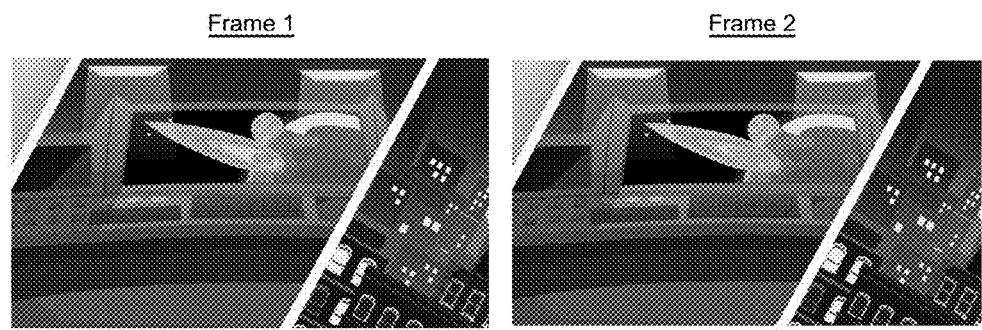
FIG. 7a displays screenshots of two consecutive frames in an example video.
Figure 7B:
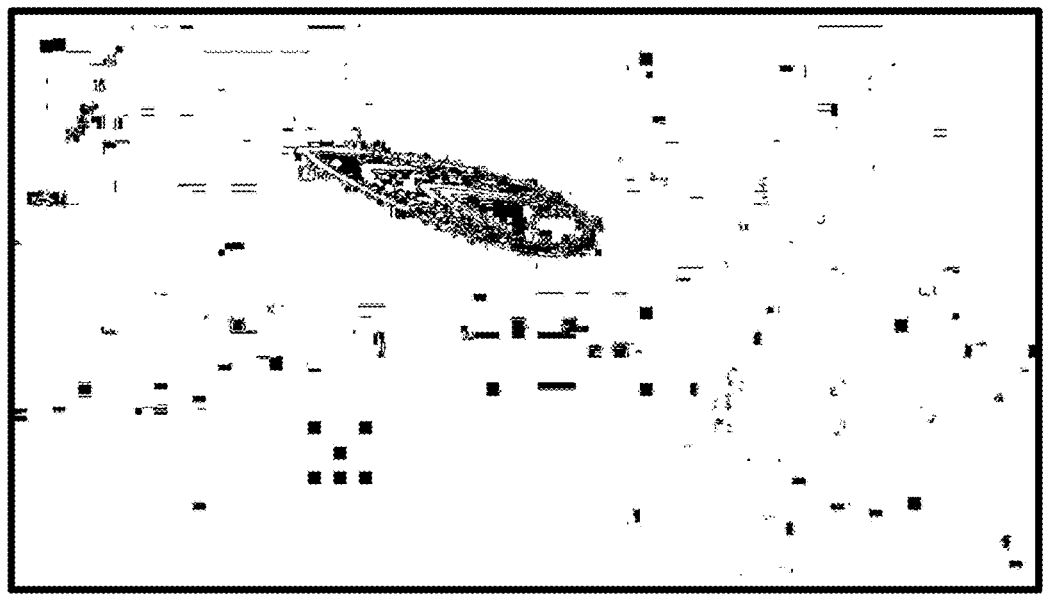
Figure 7C:
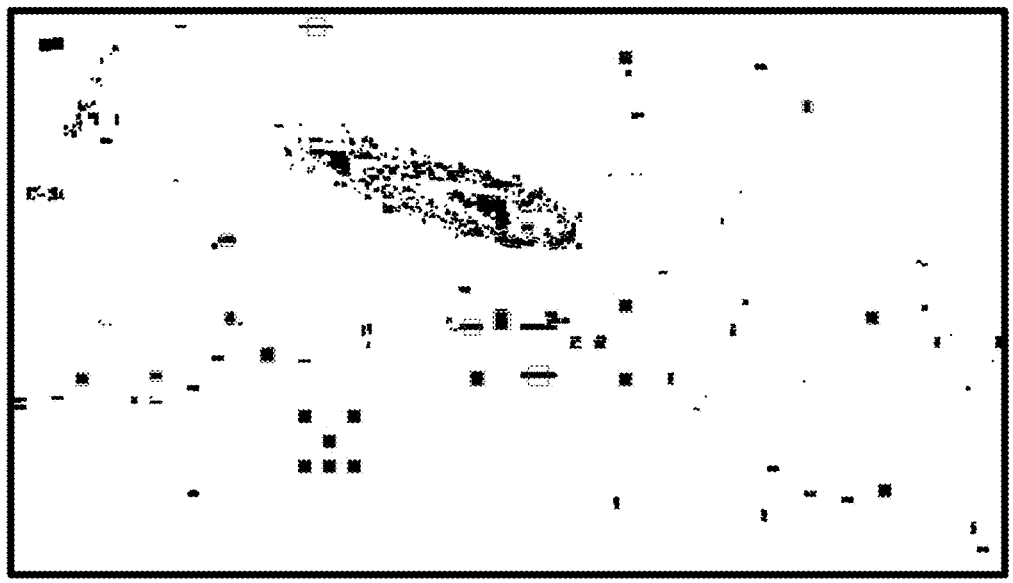
Figure 7D:
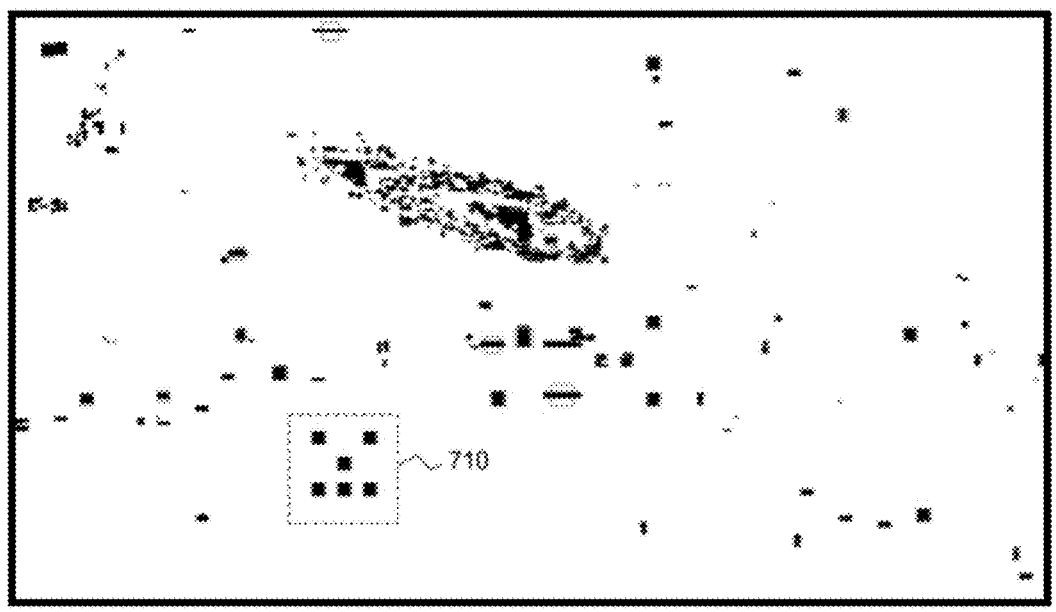

The above results in an image in which areas that correspond to pixel differences between the two frames substantially equally to Z appear as black "blobs" in the image (see, for example, FIG. 7*b*-7*d*). Areas having no corresponding pixel difference across the two frames or having a corresponding pixel difference other than Z (plus or minus some tolerance) appear as white in the segmented image.

The system filters out the black blobs (i.e., the areas with a pixel value difference substantially equally to Z) that are smaller than the cells of watermarks (step 640). In one embodiment, the system performs step 640 using well-known Morphological Operations (i.e., the erode operator) to filter out noise by first reducing the radius of each black blob, and successively enlarging back to its original size. This removes black blobs below a certain threshold in size.

The system then identifies any remaining black blobs that substantially match the size and shape of a watermark cell ("candidate blobs") (step 650). In one embodiment, the system performs step 650 by using well-known Blob Detection techniques with the following constraints:
1. The area for a candidate blob should match the size of a cell in a watermark grid, with some tolerance for transcoding and resizing resilience. An example tolerance is twenty percent of cell size.
2. The blobs should be square.

An example of a Blob Detection algorithm that may be used (in conjunction with the above constraints) is the Blob Detection algorithm offered in the industry-standard OpenCV library version 2.4.13.

The system extract watermark patterns by identifying groups of candidate blobs that match constraints for a watermark (step 660). In one embodiment, the system achieves step 660 by performing the following
1. Grouping candidate blobs of similar size.

2. Enforcing site spacing (i.e., filtering out the blob groups that do not match the spacing constraints of watermarks.)

3. Pattern matching on Sequence ID cells (i.e., determining whether the blobs corresponding to potential Sequence ID cells match a Sequence ID pattern for a watermark). In order to achieve resilience to video mirroring along the X and Y axis, pattern matching is implemented in a way that is idempotent to this transformation. In other words, patterns are matched against their horizontal and vertical flipped versions as well.

For each of the extracted watermarks, the system determines the Sequence ID bits and the data bits from the location and color of the cells (step 665). If the system identifies a plurality of watermarks with the same Sequence ID pattern (i.e., the same Sequence ID) and different data bits, the system uses statistical analysis on the data bits to filter out false positives (step 670). In one embodiment, this is performed by simply selecting the group data bits for the sequence ID that appear the most frequently. For example, assume that the system extracts watermarks for Sequence ID 1 with the following data bits:

1001
0011
1001
1001

In this example, data bits "1001" appear more frequently with Sequence ID 1 than data bits "0011." Consequently, the system will assume that the watermark corresponding to the "0011" data bits is a false positive, and it will determine that "1001" are the data bits for Sequence ID 1.

Steps 620-670 are performed for each pair of consecutive frames in the video to extract all watermarks embedded in the video (step 680). Once all the watermarks have been extracted, the digital signature is reconstructed by combining data bits from each sequence into a complete digital signature (step 690).

Sample Decoding

An example of steps 620-670 in FIG. 6 (i.e., recovering a watermark previously embedded in a video) is described with respect to FIGS. 7a-7e. First, two consecutive frames are taken. FIG. 7a illustrates the two consecutive video frames that are analyzed for purposes of this example.

Per steps 620 and 630, the system calculates the absolute pixel difference between the two frames and performs image segmentation. FIG. 7b illustrates the resulting segmented imaged. The black blobs illustrate the areas where the difference in the Cb channel between two frames is approximately equal to Z.

Per step 640, the system filters the noise out, resulting in the disappearance of all black blobs too small to be a watermark cell. FIG. 7c illustrates the segmented image after this step. Per step 650, the system then used Blob Detection to identify black blobs that substantially match the shape and size of the watermark. The candidate blobs in the segmented image are shown with a square border in FIG. 7c.

Next, per step 660, the system identifies any group of candidate blobs that match the constraints of a watermark. In the case of this example, only one candidate watermark 710 is found, which is illustrated in FIG. 7d. The resulting 3×3 grid from this watermark is therefore:

TABLE 2

| | | |
|---|---|---|
| 1 | 0 | 1 |
| 0 | 1 | 0 |
| 1 | 1 | 1 |

Assuming the following mapping, the original data sequence can be reconstructed:

TABLE 3

| | | |
|---|---|---|
| Sequence ID Bit 0 | Data Bit 0 | Sequence ID Bit 1 |
| Data Bit 1 | Sequence ID Bit 4 | Data Bit 2 |
| Sequence ID Bit 2 | Data Bit 3 | Sequence ID Bit 3 |

The sequence ID bits are: 1, 1, 1, 1, 1.

The data for the sequence is: 0, 0, 1, 0 Assuming the sequence ID map in FIG. 7e, the sequence ID bits correspond to Sequence ID 0. Therefore, bits 0-3 in the original digital signature are 0, 0, 1, 0.

This process is repeated for all other frames throughout the video in order to extract all the sequences embedded during the encoding process.

General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for encoding a digital signature for a user in a video and for decoding the digital signature from the video, wherein the digital signature is substantially invisible to a viewer of the video, easy to detect during the decoding process, and resilient to transcoding, video editing, and high-compression encoding, the method comprising:
   associating the user with a unique number, wherein the unique number is the user's digital signature;
   converting the digital signature into a binary number;
   dividing the binary number into sequences, wherein each sequence includes a subset of data bits from the binary number and is associated with a sequence ID that enables the data bits in the sequences to later be combined in the correct order to recreate the binary number;
   creating a watermark for each of the sequences, wherein the watermark is a P×P grid of cells with certain cells corresponding to data bits and certain cells corresponding to the sequence ID, where P is a positive integer;
   finding suitable areas to embed the watermarks in the video by performing the following:
   (i) for N sequential frames in the video, generating an image that illustrates areas that have substantially the same pixel value in a color channel across the N sequential frames, where N is a positive integer of 2 or more;
   (ii) filtering out the areas that are too small for a watermark;
   (iii) determining that the remaining areas are suitable areas;

(iv) for each of the suitable areas, calculate a luminosity change measure for the area across the N sequential frames, a color channel change measure for the area across the N sequential frames, and a mean pixel value for the color channel across the N sequential frames;

(v) store the location of all the suitable areas found in the N sequential frames, along with the corresponding luminosity change measure, color change measure, and mean pixel value;

(vi) repeating steps (i)-(v) for a plurality of sets of N frames;

ranking the suitable areas in order of least visibility by sorting the areas first in ascending order of luminosity change, and, for areas with the same luminosity change measure, further sorting them by ascending order of color change;

embedding one watermark per suitable area in order of the ranking, starting from the first sequence and proceeding through the last sequence, wherein each watermark is embedded in a subset of the N sequential frames of the suitable area in the color channel, wherein embedding a watermark comprises the following:

for either all cells representing binary 0 or all the cells representing binary 1 in the watermark, modifying the pixels in the suitable area corresponding to such cells by adding or subtracting a constant value Z to said pixel values, wherein the value of Z is such that the modification of the pixels is small enough to be invisible to the human eye, but large enough to be preserved during video transcoding;

decoding the watermarks from the video by performing the following:

extracting the color channel from the video;

for each pair of consecutive frames, generating an image that illustrates areas that have a pixel difference across the two frames substantially equal to Z ("blobs");

filtering out blobs that are smaller than the cells of a watermark;

identifying blobs that substantially match the size and shape of a watermark cell ("candidate blobs");

extracting any watermark patterns by determining whether any groups of candidate blobs match predefined constraints for a watermark;

repeating the above decoding steps for each pair of consecutive frames in a video;

mapping extracted watermark patterns to sequence IDs and extracting the data bits from each watermark pattern; and reconstructing the digital signature by combining data bits from each sequence.

2. The method of claim 1, wherein the pattern of the sequence ID cells in each watermark maps to a unique sequence ID.

3. The method of claim 2, wherein determining whether any groups of candidate blobs match constraints for a watermark comprises determining whether potential sequence ID sites in a group of candidate blobs matches a sequence ID pattern of a watermark.

4. The method of claim 1, wherein extracting any watermark patterns further comprises:

in response to extracting watermark patterns that have the same sequence ID but different data bits, performing statistical analysis to identify the most likely data bits for the sequence.

5. The method of claim 4, wherein the statistical analysis comprises selecting the most frequent pattern for the sequence.

6. The method of claim 1, wherein the binary digital signature is 32 bits, and the watermark is a 3×3 grid of cells.

7. The method of claim 6, wherein the sequenced ID bits are represented by the four corner cells and the center cell in the watermark, and wherein the remaining four cells in the watermark represent data bits.

8. The method of claim 1, wherein image segmentation is used to generate an image that illustrates areas that have substantially the same pixel value in the color channel across the N sequential frames.

9. The method of claim 1, wherein the luminosity change measure is the standard deviation for the Y channel, and the color channel change measure is the standard deviation for the color channel.

10. The method of claim 1, wherein the color channel is the Cb channel.

11. A non-transitory, computer-readable medium comprising a computer program, that, when executed by a computer system, enables the computer system to perform the following method for encoding a digital signature for a user in a video and for decoding the digital signature from the video, wherein the digital signature is substantially invisible to a viewer of the video, easy to detect during the decoding process, and resilient to transcoding, video editing, and high-compression encoding, the method comprising:

associating the user with a unique number, wherein the unique number is the user's digital signature;

converting the digital signature into a binary number;

dividing the binary number into sequences, wherein each sequence includes a subset of data bits from the binary number and is associated with a sequence ID that enables the data bits in the sequences to later be combined in the correct order to recreate the binary number;

creating a watermark for each of the sequences, wherein the watermark is a P×P grid of cells with certain cells corresponding to data bits and certain cells corresponding to the sequence ID, where P is a positive integer;

finding suitable areas to embed the watermarks in the video by performing the following:

(i) for N sequential frames in the video, generating an image that illustrates areas that have substantially the same pixel value in a color channel across the N sequential frames, where N is a positive integer of 2 or more;

(ii) filtering out the areas that are too small for a watermark;

(iii) determining that the remaining areas are suitable areas;

(iv) for each of the suitable areas, calculate a luminosity change measure for the area across the N sequential frames, a color channel change measure for the area across the N sequential frames, and a mean pixel value for the color channel across the N sequential frames;

(v) store the location of all the suitable areas found in the N sequential frames, along with the corresponding luminosity change measure, color change measure, and mean pixel value;

(vi) repeating steps (i)-(v) for a plurality of sets of N frames;

ranking the suitable areas in order of least visibility by sorting the areas first in ascending order of luminosity change, and, for areas with the same luminosity change measure, further sorting them by ascending order of color change;
embedding one watermark per suitable area in order of the ranking, starting from the first sequence and proceeding through the last sequence, wherein each watermark is embedded in a subset of the N sequential frames of the suitable area, wherein embedding a watermark comprises the following:
for either all cells representing binary 0 or all the cells representing binary 1 in the watermark, modifying the pixels in the suitable area corresponding to such cells by adding or subtracting a constant value Z to said pixel values, wherein the value of Z is such that the modification of the pixels is small enough to be invisible to the human eye, but large enough to be preserved during video transcoding;
decoding the watermarks from the video by performing the following:
extracting the color channel from the video;
for each pair of consecutive frames, generating an image that illustrates areas that have a pixel difference across the two frames substantially equal to Z ("blobs");
filtering out blobs that are smaller than the cells of a watermark;
identifying blobs that substantially match the size and shape of a watermark cell ("candidate blobs");
extracting any watermark patterns by determining whether any groups of candidate blobs match predefined constraints for a watermark;
repeating the above decoding steps for each pair of consecutive frames in a video;
mapping extracted watermark patterns to sequence IDs and extracting the data bits from each watermark pattern; and
reconstructing the digital signature by combining data bits from each sequence.

12. The non-transitory, computer-readable medium of claim 11, wherein the pattern of the sequence ID cells in each watermark maps to a unique sequence ID.

13. The non-transitory, computer-readable medium of claim 12, wherein determining whether any groups of candidate blobs match constraints for a watermark comprises determining whether potential sequence ID sites in a group of candidate blobs matches a sequence ID pattern of a watermark.

14. The non-transitory, computer-readable medium of claim 11, wherein extracting any watermark patterns further comprises:
in response to extracting watermark patterns that have the same sequence ID but different data bits, performing statistical analysis to identify the most likely data bits for the sequence.

15. The non-transitory, computer-readable medium of claim 14, wherein the statistical analysis comprises selecting the most frequent pattern for the sequence.

16. The non-transitory, computer-readable medium of claim 11, wherein the binary digital signature is 32 bits, and the watermark is a 3×3 grid of cells.

17. The non-transitory, computer-readable medium of claim 16, wherein the sequenced ID bits are represented by the four corner cells and the center cell in the watermark, and wherein the remaining four cells in the watermark represent data bits.

18. The non-transitory, computer-readable medium of claim 11, wherein image segmentation is used to generate an image that illustrates areas that have substantially the same pixel value in the color channel across the N sequential frames.

19. The non-transitory, computer-readable medium of claim 11, wherein the luminosity change measure is the standard deviation for the Y channel, and the color channel change measure is the standard deviation for the color channel.

20. The non-transitory, computer-readable medium of claim 11, wherein the color channel is the Cb channel.

21. A computer system for encoding a digital signature for a user in a video and for decoding the digital signature from the video, wherein the digital signature is substantially invisible to a viewer of the video, easy to detect during the decoding process, and resilient to transcoding, video editing, and high-compression encoding, the system comprising:
one or more processors;
one or more memory units coupled to the one or more processors, wherein the one or more memory units store instructions that, when executed by the one or more processors, cause the system to perform the operations of:
encoding a unique signature into a video file by performing the following:
associating the user with a unique number, wherein the unique number is the user's digital signature;
converting the digital signature into a binary number;
dividing the binary number into sequences, wherein each sequence includes a subset of data bits from the binary number and is associated with a sequence ID that enables the data bits in the sequences to later be combined in the correct order to recreate the binary number;
creating a watermark for each of the sequences, wherein the watermark is a P×P grid of cells with certain cells corresponding to data bits and certain cells corresponding to the sequence ID, where P is a positive integer;
finding suitable areas to embed the watermarks in the video by performing the following:
(i) for N sequential frames in the video, generating an image that illustrates areas that have substantially the same pixel value in a color channel across the N sequential frames, where N is a positive integer of 2 or more;
(ii) filtering out the areas that are too small for a watermark;
(iii) determining that the remaining areas are suitable areas;
(iv) for each of the suitable areas, calculate a luminosity change measure for the area across the N sequential frames, a color channel change measure for the area across the N sequential frames, and a mean pixel value for the color channel across the N sequential frames;
(v) store the location of all the suitable areas found in the N sequential frames, along with the corresponding luminosity change measure, color change measure, and mean pixel value;
(vi) repeating steps (i)-(v) for a plurality of sets of N frames;
ranking the suitable areas in order of least visibility by sorting the areas first in ascending order of luminosity change, and, for areas with the same luminosity change measure, further sorting them by ascending order of color change;
embedding one watermark per suitable area in order of the ranking, starting from the first sequence and proceeding through the last sequence, wherein each watermark is embedded in a subset of the N sequential frames of the suitable area, wherein embedding a watermark comprises the following:
- for either all cells representing binary 0 or all the cells representing binary 1 in the watermark, modifying the pixels in the suitable area corresponding to such cells by adding or subtracting a constant value Z to said pixel values, wherein the value of Z is such that the modification of the pixels is small enough to be invisible to the human eye, but large enough to be preserved during video transcoding;

decoding the watermarks from the video by performing the following:
- extracting the color channel from the video;
- for each pair of consecutive frames, generating an image that illustrates areas that have a pixel difference across the two frames substantially equal to Z ("blobs");
- filtering out blobs that are smaller than the cells of a watermark;
- identifying blobs that substantially match the size and shape of a watermark cell ("candidate blobs");
- extracting any watermark patterns by determining whether any groups of candidate blobs match predefined constraints for a watermark;
- repeating the above decoding steps for each pair of consecutive frames in a video;
- mapping extracted watermark patterns to sequence IDs and extracting the data bits from each watermark pattern; and
- reconstructing the digital signature by combining data bits from each sequence.

22. The system of claim 21, wherein the pattern of the sequence ID cells in each watermark maps to a unique sequence ID.

23. The system of claim 22, wherein determining whether any groups of candidate blobs match constraints for a watermark comprises determining whether potential sequence ID sites in a group of candidate blobs matches a sequence ID pattern of a watermark.

24. The system of claim 21, wherein extracting any watermark patterns further comprises:
- in response to extracting watermark patterns that have the same sequence ID but different data bits, performing statistical analysis to identify the most likely data bits for the sequence.

25. The system of claim 24, wherein the statistical analysis comprises selecting the most frequent pattern for the sequence.

26. The system of claim 21, wherein the binary digital signature is 32 bits, and the watermark is a 3×3 grid of cells.

27. The system of claim 26, wherein the sequenced ID bits are represented by the four corner cells and the center cell in the watermark, and wherein the remaining four cells in the watermark represent data bits.

28. The system of claim 21, wherein image segmentation is used to generate an image that illustrates areas that have substantially the same pixel value in the color channel across the N sequential frames.

29. The system of claim 21, wherein the luminosity change measure is the standard deviation for the Y channel, and the color channel change measure is the standard deviation for the color channel.

30. The system of claim 21, wherein the color channel is the Cb channel.

* * * * *